Figures 1, 2:
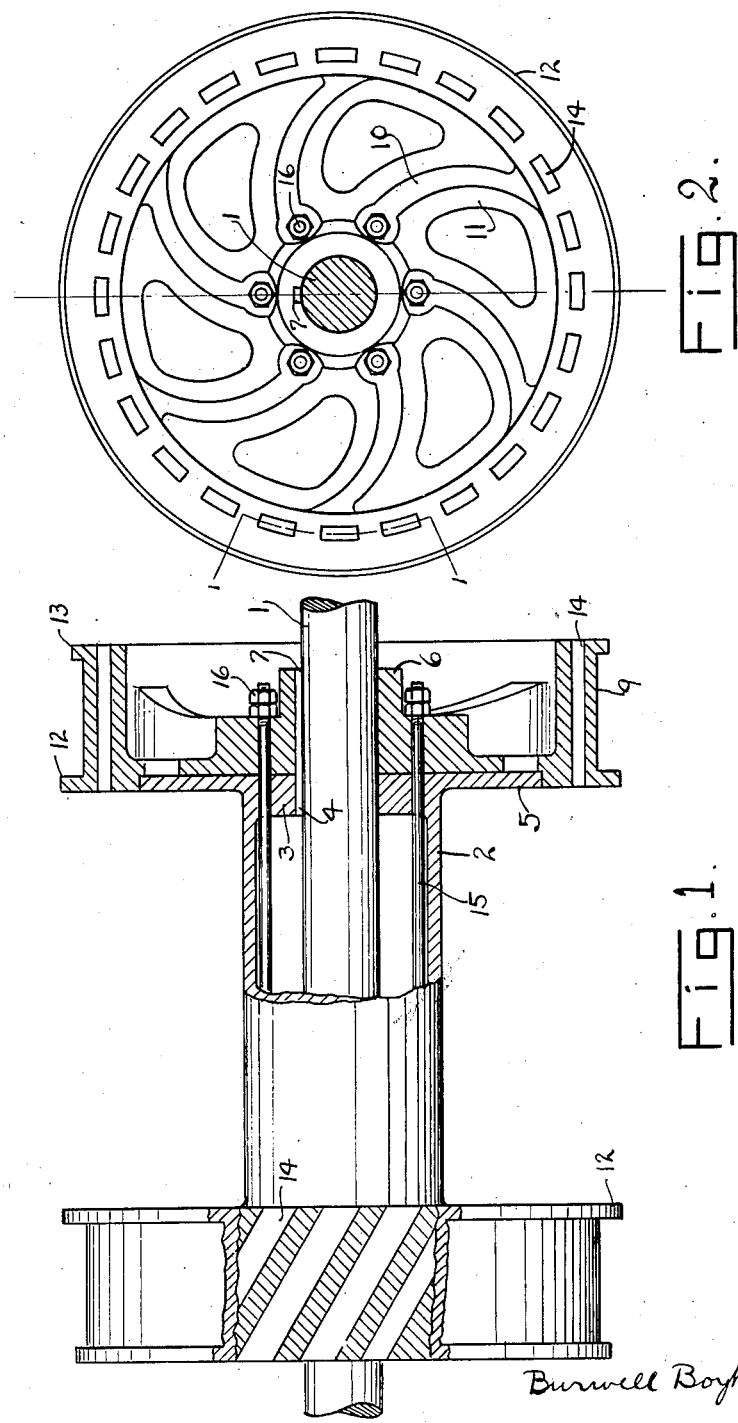

Jan. 11, 1927.

B. BOYKIN, JR 1,613,925

AIR COOLED HOISTING DRUM

Filed Feb. 19, 1926

Inventor

Burwell Boykin Jr.

By Jesse R. Stone

Attorney

Patented Jan. 11, 1927.

1,613,925

UNITED STATES PATENT OFFICE.

BURWELL BOYKIN, JR., OF BEAUMONT, TEXAS.

AIR-COOLED HOISTING DRUM.

Application filed February 19, 1926. Serial No. 89,336.

My invention relates to hoisting drums of the type used particularly in oil field work, for raising or lowering pipe or tools from, or into, the well.

In hoisting drums of this nature it has been customary to construct the spool of the drum, and the brake drum employed therewith, of what is practically integral construction. The brake drum becomes heated particularly in lowering of the pipe into the well and the expansion thereof under heat places strain upon the spool and the interior of the drum in such manner that bolts become loosened and cracks and fractures result, so that the strength of the device is permanently impaired.

It is an object of the invention to provide a hoisting drum construction whereby the brake drum can be cooled to prevent undue expansion therein. It is also desired that the spool of the drum and the brake band be independently attached to the shaft and connected to each other only in such manner as to hold them in assembled position.

Referring to the drawing herewith, Fig. 1 is a side view partly in central vertical section, the brake drum at the left being in section on the line 1—1 of Fig. 2. Fig. 2 is an end elevation of the device. Like numerals of reference are applied to like parts in both the views.

The drawings show the device mounted upon a driven shaft 1, which may be operated in either direction as desired, as is usual in this type of apparatus, by means not shown.

The reel or spool 2 is a cylindrical body with a hub 3 at each end, keyed at 4 to the shaft. It has radial end flanges 5 of ordinary construction.

A brake drum is positioned at each end of the spool. Said drums have central hubs 6 keyed to the shaft 1 at 7, and it will be noted that the same key may connect both the spool and the brake drum non-rotatably to the shaft. The hub is connected with the rim 9 of the drum through a plurality of spokes 10 spirally radiating from the hub. Said spokes are separate each from the other to allow free circulation of air therebetween. For greatest strength the spokes have webs 11 thereon, said webs also providing surface for air cooling.

The rim 9 is of material thickness with the usual marginal flanges 12 and 13 thereon. Air cooling vents 14 are formed in said rim, said vents being extended through the rim in an inclined or spiral direction, so that the air will be caught and circulated through said vents during the rotation of the drum.

The inner face of the brake drum is recessed to receive the flanged end of the spool 2, which fits therein so that its inner surface is flush with the inner surface of the drum. There is no connection between the spool and the drum except that formed by a plurality of rods 15 extended longitudinally through the hub portions of the drum and the spool, and held therein by nuts 16 at their ends. These rods are away from the outer rim of the drum so that they will not be heated materially and will have little strain placed thereon during operation.

It will be noted that the braking action of the drum is placed directly upon the shaft and that the spool is separately keyed to the shaft, so that no strain is transmitted to the reel through the drum. The action of the reel is therefore independent of the drum, and will serve to reel up the cable without affecting the brake drum.

When the brake drum is operating heat will be generated at the rim through the friction of the brake band, not shown. This heat will be largely dissipated through the circulation of air through the vents 14 and between the spokes 10. Such strain as is placed upon the rim, through the expansion and contraction resulting from heating and cooling, will be absorbed in the spirally arranged spokes 10 of the said brake drum. Very little strain will be exerted upon the reel 2 through the rods 15 and no fractures or distortion will occur.

The advantages of this construction will be apparaent to those skilled in the art.

What I claim as new is:

1. A hoisting drum construction adapted to be mounted upon a shaft, comprising a central spool separately keyed to the drum shaft, radial flanges at the ends of said spool, a brake drum at each end of said spool, said brake drum having a central hub keyed to said shaft, an outer rim on said drum, spirally arranged spokes connecting said rim to said hub, said rim having inclined transverse openings therein, and means to connect said spool and brake drum detachably together adjacent their hubs.

2. A hoisting drum construction adapted to be mounted upon a shaft, including a central spool, and separate brake drums at the ends of said spool, said spool and drum being separately connected to said shaft, a hub on said drum, a brake rim, spiral spokes connecting said hub and rim, and means including inclined passages in said rim, to allow circulation of air through said rim during operation of said drum.

3. A hoisting drum construction adapted to be mounted upon a rotatable shaft, including a central spool, a brake drum at each end thereof and detachably connected therewith adjacent said shaft, separate connections for said brake drum and said spool with said shaft and an outer brake rim on said brake drum, said rim having inclined openings transversely thereof.

4. A hoisting drum construction including a central spool, brake drums at each end thereof, said spool and drums having separate connection with said shaft, a hub on said brake drum, an outer rim, spiral spokes connecting said hub and said rim, and means to allow air-cooling of said rim.

In testimony whereof I hereunto affix my signature this 15th day of February, A. D. 1926.

BURWELL BOYKIN, Jr.